US008434229B2

(12) United States Patent
Okano et al.

(10) Patent No.: US 8,434,229 B2
(45) Date of Patent: May 7, 2013

(54) LIQUID EJECTION HEAD MANUFACTURING METHOD

(75) Inventors: Akihiko Okano, Fujisawa (JP); Yasuaki Tominaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 13/278,204

(22) Filed: Oct. 21, 2011

(65) Prior Publication Data

US 2012/0124835 A1 May 24, 2012

(30) Foreign Application Priority Data

Nov. 24, 2010 (JP) ................................ 2010-261606

(51) Int. Cl.
*B21D 53/76* (2006.01)
*B23P 17/00* (2006.01)
*B41J 2/15* (2006.01)
*B41J 2/145* (2006.01)

(52) U.S. Cl.
USPC .......................................... 29/890.1; 347/20

(58) Field of Classification Search ................. 29/890.1, 29/25.35; 347/20, 40, 44
See application file for complete search history.

(56) References Cited

U.S. PATENT DOCUMENTS 4,004,043 A * 1/1977 Hiraoka ........................ 430/269
4,393,129 A * 7/1983 Glashauser et al. .......... 430/296
4,565,859 A * 1/1986 Murai et al. .................. 528/365
4,657,631 A * 4/1987 Noguchi ......................... 216/27
5,478,606 A * 12/1995 Ohkuma et al. .............. 427/555
5,916,452 A * 6/1999 Kobayashi et al. ............. 216/27
6,109,718 A * 8/2000 Murakami et al. .............. 347/14
6,123,863 A * 9/2000 Shimomura et al. ............ 216/27
6,137,510 A * 10/2000 Sato et al. ....................... 347/63
6,318,842 B1 * 11/2001 Shimomura et al. ........... 347/45
6,455,112 B1 * 9/2002 Ohkuma et al. .............. 427/504
6,461,798 B1 * 10/2002 Ohkuma et al. .............. 430/320
6,631,970 B2 * 10/2003 Sato et al. ....................... 347/19
6,895,668 B2 * 5/2005 Imamura ...................... 29/890.1
6,960,424 B2 * 11/2005 Miyagawa et al. ........... 430/320
6,986,980 B2 * 1/2006 Kubota et al. ................. 430/156
7,485,412 B2 * 2/2009 Okano et al. .................. 430/320
7,629,111 B2 * 12/2009 Kubota et al. ................. 430/320
2002/0019500 A1 * 2/2002 Roth et al. .................... 525/531
2004/0072107 A1 * 4/2004 Kubota et al. ................. 430/320
2005/0181309 A1 * 8/2005 Miyagawa et al. ........... 430/311
2005/0248623 A1 * 11/2005 Komuro et al. ................. 347/58
2006/0114295 A1 * 6/2006 Asai et al. ....................... 347/65
2006/0125884 A1 * 6/2006 Sato et al. ....................... 347/65
2006/0127813 A1 * 6/2006 Ohkuma et al. .............. 430/311
2006/0132539 A1 * 6/2006 Hino et al. ...................... 347/47

(Continued)

FOREIGN PATENT DOCUMENTS

JP 2006-168345 A 6/2006

*Primary Examiner* — David Angwin

(74) *Attorney, Agent, or Firm* — Fitzpatrick, Cella, Harper & Scinto

(57) ABSTRACT

A liquid ejection head manufacturing method includes, in the following order, preparing a substrate having a flow path mold; arranging a first layer serving as a flow path wall member so as to cover the flow path mold; curing a portion of the first layer serving as a flow path sidewall; arranging a second layer so as to cover the cured portion of the first layer and the flow path mold; planarizing the second layer by pressing the second layer toward the substrate; arranging the ejection port in the first layer and the second layer; and forming the flow path by removing the flow path mold.

3 Claims, 3 Drawing Sheets

U.S. PATENT DOCUMENTS

| | | | | |
|---|---|---|---|---|
| 2006/0277755 | A1* | 12/2006 | Kubota et al. | 29/890.1 |
| 2007/0085877 | A1* | 4/2007 | Ohkuma et al. | 347/45 |
| 2007/0099121 | A1* | 5/2007 | Kubota et al. | 430/311 |
| 2009/0133256 | A1* | 5/2009 | Okano et al. | 29/890.1 |
| 2009/0229125 | A1* | 9/2009 | Kato et al. | 29/890.1 |

* cited by examiner

LIQUID EJECTION HEAD MANUFACTURING METHOD

BACKGROUND OF THE INVENTION

1. Field of the Invention

The present invention relates to a method of manufacturing a liquid ejection head for ejecting a liquid.

2. Description of the Related Art

A typical example of the liquid ejection head for ejecting a liquid includes an inkjet recording head applied to an inkjet recording system ejecting ink to a recording medium for recording. The inkjet recording head generally includes an ink flow path, an ejection energy generating unit disposed in a part of the flow path, and a fine ink ejection port for ejecting ink by energy generated therein.

Japanese Patent Application Laid-Open No. 2006-168345 discloses a method for manufacturing a liquid ejection head applicable to the inkjet recording head. The method includes forming a flow path mold on a substrate having a plurality of ejection energy generating units; and applying thereto a covering resin layer made of a curable resin and for serving as a flow path wall member having a flow path wall. The method further includes curing a portion surrounding the mold serving as the flow path wall and containing an upper surface of the covering layer; laminating a polished silicon plate thereon; forming an ejection port in the plate; and then removing an uncured portion of the covering layer and the mold to form a space serving as the flow path.

In recent years, the recording apparatus has been needed to increase the image quality and the recording speed to higher levels. In order to meet the needs, the ejection ports and the flow path communicatively connected thereto are required to be arranged at high density and the volume of each droplet to be ejected is also required to be equalized at further higher levels.

Unfortunately, the method disclosed in Japanese Patent Application Laid-Open No. 2006-168345 has a possibility that the covering layer may have a slightly uneven upper surface thereon due to existence of a partially remaining flow path mold in the entire substrate surface. If the silicon plate is arranged so as to conform to the uneven surface, the distance between the ejection energy generating unit and the ejection port may vary. If that happens, it is concerned that the variation of the distance causes a variation of the volume of a droplet ejected from each ejection port, which may affect an image to be recorded. Even if a high pressure is applied to laminate the silicon plate to the covering layer, it is difficult to planarize the covering layer sufficiently enough to remove the unevenness thereof because the upper surface of the covering layer is partially cured.

SUMMARY OF THE INVENTION

In view of the above problem, it is an object of the present invention to provide a method of manufacturing a liquid ejection head further reducing the variation in liquid amount of ejection droplet and having a flow path of a desired shape formed with high precision, and with good yield.

The present invention relates to a method of manufacturing a liquid ejection head including an ejection port for ejecting a liquid and a flow path wall member constituting a flow path wall communicatively connected the ejection port, the liquid ejection head manufacturing method including: step A of preparing a substrate having the flow path mold; step B of arranging a first layer serving as the flow path wall member so as to cover the flow path mold; step C of curing a portion serving as a flow path sidewall of the first layer; step D of arranging a second layer so as to cover the cured portion of the first layer and the flow path mold; step E of planarizing the second layer by pressing the second layer toward the substrate side; step F of arranging the ejection port in the first layer and the second layer; and step G of forming the flow path by removing the flow path mold in this order.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Note that the liquid ejection head can be installed in a facsimile machine having a printer, copier, and a communication system; an apparatus such as a word processor having a printer unit; and further an industrial recording apparatus combined with various processing apparatuses in complex manner. For example, the liquid ejection head is applicable to biochip generation, electronic circuit printing, and other applications such as ejecting drug in a spray manner.

Figure 1:
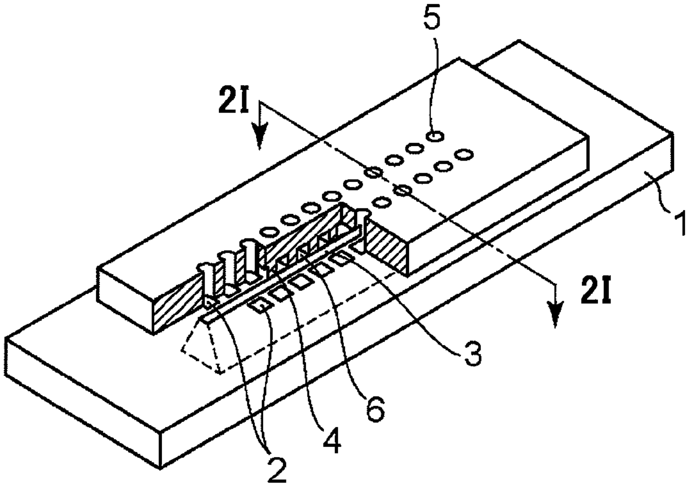
FIG. 1 is a schematic perspective view of a liquid ejection head manufactured by a manufacturing method according to an embodiment of the present invention.

FIG. 1 is a partially cutaway schematic perspective view of a liquid ejection head manufactured by an embodiment of the present invention.

The liquid ejection head of the present invention illustrated in FIG. 1 has a substrate 1 on which energy generating elements 2 each generating energy used to eject a liquid such as ink are formed at a predetermined pitch. The substrate 1 includes thereon a supply port 3 for supplying a liquid. The supply port 3 is interposed between the two rows of the energy generating elements 2. The substrate 1 further includes thereon ejection ports 5 opened upward of the energy generating elements 2 and a flow path wall member 4 constituting a wall of individual liquid flow paths 6 communicatively connected from the supply port 3 to each ejection port 5.

Referring to FIGS. 2A to 2I, the method of manufacturing the liquid ejection head of the present invention will be described. FIGS. 2A to 2I are schematic cross-sectional views for describing the method of manufacturing the liquid ejection head according to a first embodiment of the present invention. More specifically, FIGS. 2A to 2I are schematic cross-sectional views taken along a plane passing through section line 2I-2I of FIG. 1 at a position perpendicular to the substrate 1 for illustrating each step.

Figure 2A:
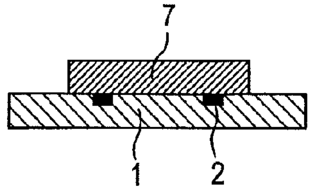
FIGS. 2A, 2B, 2C, 2D, 2E, 2F, 2G, 2H and 2I are a schematic cross-sectional views illustrating an example of the manufacturing method according to the embodiment of the present invention.

As illustrated in FIG. 2A, a mold 7 having a shape of the flow path 6 is mounted on the substrate 1 in an even state. The upper surface of the substrate 1 has an energy generating element 2 generating energy used to eject a liquid. First, the substrate 1 in this state is prepared (step A). Note that the following description will focus on one liquid ejection head unit by illustration. Note also that a 6 to 12 inch wafer is used as the substrate 1; a plurality of liquid ejection head units is collectively manufactured on one wafer; and finally the wafer can be cut to obtain each liquid ejection head.

The mold 7 is made of a resin material such as a positive photosensitive resin, metal, or an inorganic material. For example, the mold 7 can be formed such that a positive photosensitive resin is placed on the substrate 1 by a method of applying the resin or a method of laminating a film of the resin, and then is patterned into a shape of the flow path by photolithography or the like. Since the mold 7 is removed from the substrate 1 at a later step, the mold 7 can be easily solvable so as to be easily removed. In particular, polymethylisopropenylketone or a copolymer of methacrylic acid and methacrylate can be used. The reason for this is that the above compound can be easily removed by a solvent and the component of the mold 7 less affects a later described first layer 8 due to its simple composition.

Figure 2B:
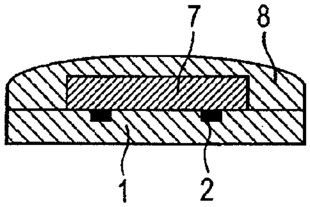

Then, as illustrated in FIG. 2B, a first layer 8 serving as the flow path wall member is formed so as to cover the flow path mold (step B). The first layer 8 can be made of, for example, a thermosetting resin, a photocurable resin, or the like. More specific examples of the photocurable resin include a resin containing an epoxy resin and a photo cationic polymerization. The first layer 8 containing the above materials is formed by application or lamination so as to be thicker than the upper surface of the mold 7, which is a surface opposite to the substrate 1. Alternatively, the first layer 8 may be formed so as to cover the entire mold 7.

Figure 2C:
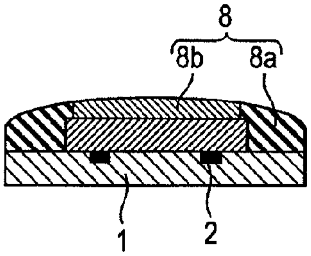
Figure 3:
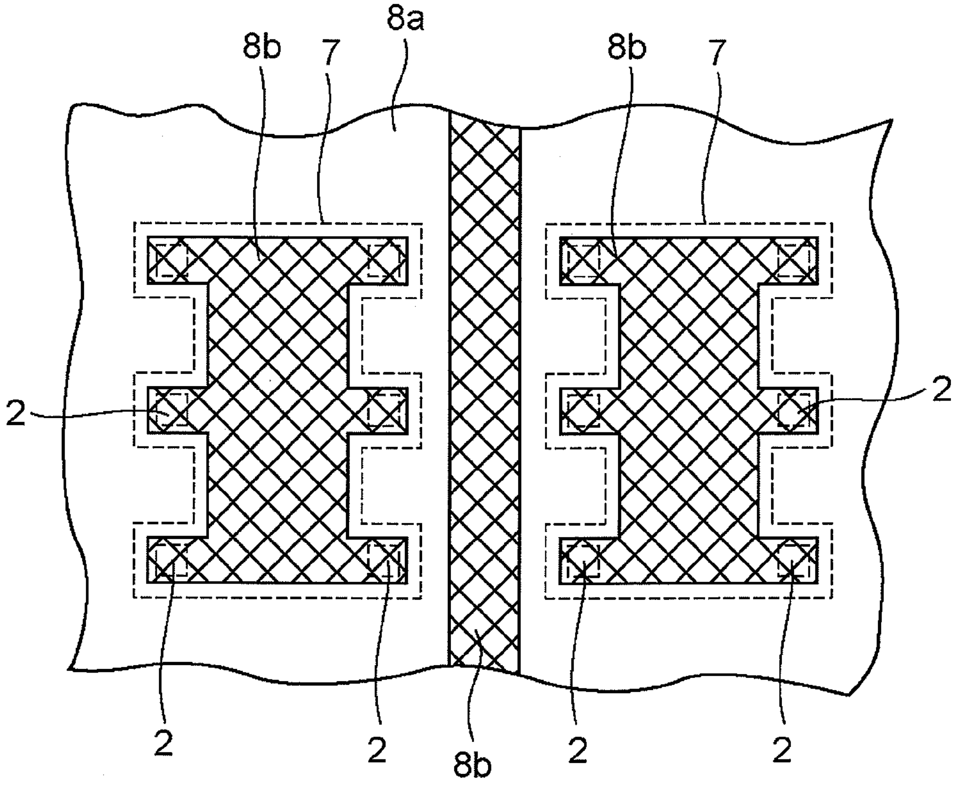
FIG. 3 is a schematic view illustrating a state during the process of the manufacturing method according to the embodiment of the present invention.

Then, as illustrated in FIG. 2C, a portion serving as a flow path sidewall of the first layer 8 is cured to form a cured portion 8*a* in the first layer 8 (step C). As described later, when an upper surface of a second layer 9 is planarized, it is necessary to prevent the flow path mold 7 from extending in a direction parallel to the substrate. In light of this, of the portion contacting the mold 7 in the first layer 8, the portion contacting an outer side surface of the mold 7 is cured to form the cured portion 8*a*. The curing is performed by photolithography or using laser beams such that the first layer 8 is partially provided with an energy required for curing. In other words, part of the first layer 8 made of a curing material is cured. An uncured portion 8*b* remains substantially unchanged. FIG. 3 illustrates a state of the substrate illustrated in FIG. 2C viewed from above. As illustrated in FIG. 3, the cured portion 8*a* is formed so as to enclose the entire mold 7. As understood from the drawing, the cured portion 8*a* may be formed so as to overlap part of the mold 7.

Of the portions on the mold 7 in the first layer 8, a portion used to open an ejection port at a later step such as a portion facing the energy generating element 2 should not be cured for ease of removal. A portion between the flow path molds 7 in the first layer 8 may be used as the uncured portion 8*b*. Note that the uncured portion 8*b* may be removed.

Figure 2D:
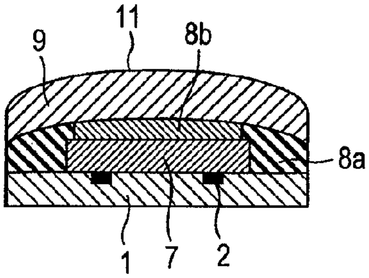

Then, as illustrated in FIG. 2D, a second layer 9 is formed so as to cover the cured portion 8*a* and the mold (step D). According to the present embodiment, the uncured portion 8*b* is not removed. Accordingly, the second layer 9 also covers the uncured portion 8*b*. Considering a floating of the second layer 9, the second layer 9 should be formed in the wafer such that the height of an upper surface 11 of the second layer 9 from the surface of the substrate 1 is greater than the height of the ejection port 5 from the surface of the substrate 1.

The second layer 9 can be made of a thermosetting resin, a photocurable resin, or other curable resin. Considering the affinity with the first layer 8 (cured portion 8*a* and uncured portion 8*b*), the second layer and the first layer can be made of a material of the same composition. Note that the mixing ratio of each component in the composition needs not be the same.

Figure 2E:
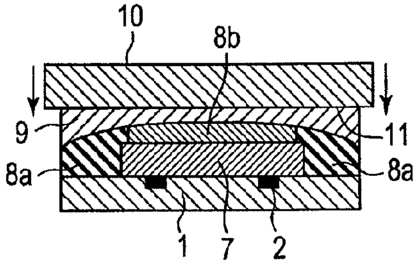

Then, as illustrated in FIG. 2E, the upper surface of the second layer 9 is planarized such that for example, a plate-like plate member 10 is used to press the upper surface of the second layer 9 in a direction (indicated by arrows in the figure) from the upper surface of the second layer 9 to the substrate 1 (step E). The plate member 10 can be a substrate made of silicon or quartz and subjected to mirror finish by polishing. For example, a thickness distribution of 2 μm or less can be used, and a surface roughness Ra of 1 nm or less can be used, but the substrate is not limited to this. In order to improve the demoldability between the plate member and the resin surface, the material can be selected such that each polarity is different from each other. A water-repellent film or an oil-repellent film can be formed on the plate member or the resin surface. As the pressing method, the plate member is placed on the resin surface and then a commercially available pressing apparatus is used to apply pressure from above and below, but the pressing method is not limited to this. Warming or cooling the entire substrate is useful in assisting in floating the resin. Vacuum drawing up to a certain pressure is useful in surely removing air between the plate member and the resin.

The second layer 9 has a higher flowability than the cured portion 8*a* made of a resin. Thus, the upper surface of the second layer 9 is planarized to conform to the shape of the surface of the flat plate member 10. An adjustment is made such that the surface of the plate member is parallel to the surface of the substrate 1. Then, the upper surface 11 of the second layer 9 is formed so as to be parallel to the surface of the substrate 1.

Figure 2F:
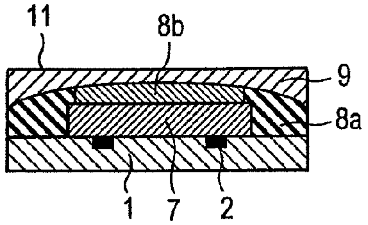

Following the above steps, the upper surface 11 of the second layer 9 is planarized as illustrated in FIG. 2F. For example, a plurality of energy generating elements 2 can be formed on the surface of an 8-inch wafer substrate 1 such that the difference between the maximum and minimum distances between each energy generating element 2 and the upper surface 11 is equal to or less than 1 μm.

Figure 2G:
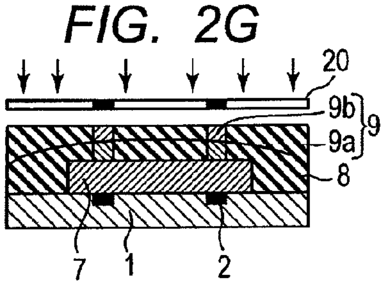

Then, as illustrated in FIG. 2G, a mask 20 is used to shield the portion serving as an ejection port. Then, the second layer 9 is exposed to cure the exposed portion. Thus, a cured portion 9*a* is formed in the second layer 9 and the unexposed portion remains as an uncured portion 9*b*. At this time, part of the uncured portion 8*b* not cured in the first layer 8 is exposed and cured together with the second layer 9. When the second layer 9 is cured, the first layer 8 and the second layer 9 serving as the flow path wall member can be integrated depending on the material of the first layer 8 and the second layer 9.

Figure 2H:
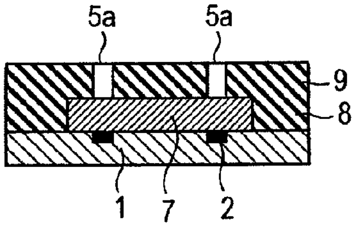

Then, as illustrated in FIG. 2H, openings 5*a* serving as ejection ports are formed in the first layer 8 and the second layer 9 (step F). The openings 5*a* serving as ejection ports can be formed by removing the uncured portions from the first layer 8 and the second layer 9. The mold 7 is exposed through the openings 5*a*. Note that in the step F, the openings 5*a* serving as ejection ports can be formed in the second layer 9 by dry-etching the second layer 9.

Figure 2I:
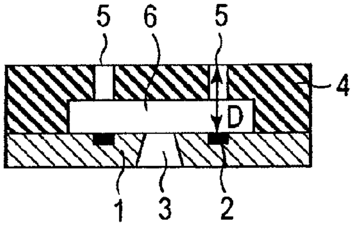

Then, as illustrated in FIG. 2I, the flow path 6 is formed by removing the mold 7 (step G). The planarization in the step E equalizes the distance D between each of the plurality of ejection ports 5 and the surface having each energy generating element 2 on the substrate 1.

EXAMPLE

In the present example, an inkjet head is taken as an example of the liquid ejection head to describe the manufacturing method thereof.

First, energy generating elements for ejecting ink and a silicon substrate 1 of a disk-like wafer having drivers and logic circuits formed therein were prepared. Note that in the present example, the number of flow path molds was the same as the number of chip units in order to collectively manufacture a plurality of chip units of inkjet heads.

Then, a positive resist layer made of a photodegradable positive resist was formed on the substrate 1. Note that the photodegradable positive resist forming the positive resist layer was formed by adjusting polymethylisopropenylketone (ODUR-1010 manufactured by Tokyo Ohka Kogyo Co., Ltd.) to have a resin concentration of 20 wt %. Then, the photodegradable positive resist was applied to the substrate by a spin coating method. Subsequently, the substrate was prebaked on a hot plate at 120° C. for 3 minutes and then in a nitrogen-replaced oven at 150° C. for 30 minutes to form a positive resist layer with a film thickness of 5 μm. Then, the positive resist layer was exposed by deep UV light irradiation with a light exposure of 18000 mJ/cm$^2$ through a flow path pattern mask by means of a Deep-UV aligner exposure apparatus UX-3000 (product name) manufactured by Ushio Inc. Subsequently, a nonpolar solvent methyl isobutyl ketone (MIBK)/xylene=2/3 solution was used for development and then xylene was used for rinsing to form a mold 7 having a shape of the flow path 6 on the substrate 1 (FIG. 2A).

Then, a first layer 8 made of a photocurable resin was formed on the ink flow path pattern so as to cover the ink flow path pattern (FIG. 2B). As the photocurable resin, composition A having the following compositions was used.

(Composition A)

| | |
|---|---|
| EHPE-3150 (product name, manufactured by Daicel Chemical Industries, Ltd.) | 100 pts. wt. (parts by weight) |
| HFAB (product name, manufactured by Central Glass Co., Ltd.,) | 20 pts. wt. |
| A-187 (product name, manufactured by Nippon Unicar Company Limited) | 5 pts. wt. |
| SP170 (product name, manufactured by Adeka Corporation) | 2 pts. wt. |
| xylene | 80 pts. wt. |

The composition was applied to the substrate 1 by a spin coating method and prebaked at 90° C. for 3 minutes on a hot plate to form the first layer 8 with a thickness of 5 μm (on the substrate).

Then, a mask aligner MPA600FA (manufactured by Canon Inc.,) was used for pattern exposure with a light exposure of 3000 mJ/cm$^2$ through a pattern mask. Then, a post exposure bake (PEB) was performed at 90° C. for 180 seconds to cure a portion 8*a* enclosing the flow path mold.

Then, the composition A was applied to the substrate so as to cover the cured portion 8*a* and the mold 7 thereon. Then, the substrate was prebaked on a hot plate at 90° C. for 3 minutes to form a second layer 9 made of a photocurable resin layer and having a thickness of about 5 μm.

Then, a plate-like plate member 10 was placed on the second layer 9 in a direction from the upper surface 11 thereof to the substrate 1. Then, a pressing apparatus (ST-50) manufactured by Toshiba Machine Co., Ltd., was used to press the substrate in a vacuum chamber from above and below by increasing the temperature and pressure. As the plate-like plate member 10, Durasurf (manufactured by Daikin Industries, Ltd.) formed on a surface of a quartz substrate manufactured by Iiyama Precision Glass Co., Ltd., and polished with high precision was used. The pressed plate member 10 was demolded after planarization.

Further, a mask aligner MPA600FA (manufactured by Canon Inc.,) was used to pattern-expose the second layer 9 and the uncured portion 8*b* of the first layer 8 with a light exposure of 3000 mJ/cm$^2$ through a mask 20 having an ink ejection port pattern. Then, the substrate was baked at 90° C. for 180 seconds to cure the exposed portion.

Then, a methyl isobutyl ketone/xylene=2/3 solution was used for development and then xylene was used for rinsing to form an ink ejection port 5*a*.

Then, the bottom surface of the substrate 1 was etched to form an ink supply port 3. Then, the silicon substrate was subjected to anisotropic etching to form the ink supply port 3 in such a manner that a protection layer was applied to the entire surface, a slit-like etching mask was formed on the bottom surface of the substrate by a positive resist, and then the substrate was immersed in a tetramethylammonium hydroxide aqueous solution at 80° C.

Then, after the protection layer was removed, a Deep-UV aligner exposure apparatus UX-3000 (product name) manufactured by Ushio Inc., was used to expose the entire surface with a light exposure of 7000 mJ/cm$^2$ to solubilize the mold 7 forming the ink flow path pattern. Then, the substrate was dipped into methyl lactate and ultrasonic waves were applied to remove the ink flow path pattern. Then, the substrate was cut for each chip unit to obtain an inkjet head.

The inkjet head formed by the above method was shaped such that the distance D between the surface having each energy generating element 2 in the substrate 1 and the ejection port 5 was equal for each nozzle. The inkjet head was electrically wired and mounted on a printer. Then, ejection and recording were evaluated to find that a stable ejected droplet amount and high-quality printing were observed.

COMPARATIVE EXAMPLE

A comparative example is different from the example in that the photocurable resin is not applied to the first layer 8 and the plate-like plate member is not pressed. The comparative example will be described below.

Like the example, a photocurable resin was formed on the mold 7 as the first layer 8 so as to cover the mold 7. Subsequently, the first layer 8 was pattern-exposed with a light exposure of 3000 mJ/cm$^2$ through an ink ejection port pattern mask to cure the exposed portion. Then, the uncured portion was removed to form an ink ejection port 5*a*. Subsequently, the inkjet head was formed in the same steps as in the example. The inkjet head formed by the above method was such that the distance D between the surface having each energy generating element 2 in the substrate 1 and the ejection port 5 varied depending on each nozzle. The inkjet head was mounted on a printer. Then, ejection and recording were evaluated to find that no problem was found in the ejection itself, but the obtained image sharpness was lower than that of the example, which is assumed to be caused by the variation in the amount of ejection.

The present invention can manufacture a highly reliable liquid ejection head further reducing the variation in liquid amount of ejection droplet, capable of repeatedly ejecting an equal liquid amount of droplet in a stable manner, having a flow path communicatively connected to the ejection port with high precision, and manufacturable with good yield.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-261606, filed Nov. 24, 2010, which is hereby incorporated by reference herein in its entirety.

What is claimed is:

1. A method of manufacturing a liquid ejection head comprising an ejection port for ejecting a liquid and a flow path wall member constituting a flow path wall defining a flow path communicatively connected to the ejection port, the liquid ejection head manufacturing method comprising, in the following order:

preparing a substrate having a flow path mold;

arranging a first layer serving as the flow path wall member so as to cover the flow path mold;

curing a portion of the first layer serving as a flow path sidewall;

arranging a second layer so as to cover the cured portion of the first layer and the flow path mold;

planarizing the second layer by pressing on the second layer toward the substrate;

arranging the ejection port in the first layer and the second layer; and forming the flow path by removing the flow path mold.

2. The liquid ejection head manufacturing method according to claim 1, wherein after the step of curing the portion of the first layer and before the step of arranging the second layer, a portion of the first layer not cured in the curing step is removed from the first layer.

3. The liquid ejection head manufacturing method according to claim 1, wherein after the step of planarizing the second layer, collectively curing a part of a portion of the first layer not cured in the curing step and a part of the second layer, and forming the ejection port by removing portions of the first and second layers not cured in the collective curing step.

* * * * *